United States Patent
Bjarnø et al.

(10) Patent No.: US 6,726,020 B1
(45) Date of Patent: Apr. 27, 2004

(54) METHOD AND DEVICE FOR A DRY CLEANSING PLANT FOR ALUMINUM REDUCTION FURNACES EXHAUST GAS

(75) Inventors: Odd E. Bjarnø, Oslo (NO); Ole K. Bøckman, Oslo (NO)

(73) Assignee: ABB Fläkt AB, Stockholm (SE)

( * ) Notice: Subject to any disclaimer, the term of this patent is extended or adjusted under 35 U.S.C. 154(b) by 0 days.

(21) Appl. No.: 09/787,317

(22) PCT Filed: Sep. 16, 1999

(86) PCT No.: PCT/NO99/00284

§ 371 (c)(1),
(2), (4) Date: May 14, 2001

(87) PCT Pub. No.: WO00/15873

PCT Pub. Date: Mar. 23, 2000

(30) Foreign Application Priority Data

Sep. 17, 1998 (NO) ............................ 19984318

(51) Int. Cl.[7] .............................. B07B 7/04; B07B 9/02
(52) U.S. Cl. .................... 209/138; 209/139.1; 209/133; 96/150; 96/152
(58) Field of Search ............................ 209/138; 96/150, 96/152; 95/108, 107, 109, 116

(56) References Cited

U.S. PATENT DOCUMENTS

| | | | |
|---|---|---|---|
| 3,876,394 A | * 4/1975 | Nix ............................ 95/110 |
| 4,065,271 A | 12/1977 | Weckesser et al. |
| 4,501,599 A | * 2/1985 | Loukos ........................ 95/109 |
| 4,525,181 A | * 6/1985 | Bockman ..................... 95/131 |
| 4,973,458 A | * 11/1990 | Newby et al. .......... 423/244.07 |
| 5,718,873 A | * 2/1998 | Wellwood et al. ........... 422/171 |
| 6,290,752 B1 | * 9/2001 | Koller et al. ................. 95/107 |

FOREIGN PATENT DOCUMENTS

| | | | |
|---|---|---|---|
| EP | 0117338 | * 5/1984 | ........... B01D/53/34 |
| EP | 0 117 338 | 9/1984 | |
| GB | 1 416 344 | 12/1975 | |

* cited by examiner

*Primary Examiner*—Donald P. Walsh
*Assistant Examiner*—Jonathan R Miller
(74) *Attorney, Agent, or Firm*—Kenyon & Kenyon

(57) ABSTRACT

Methods and apparatus are provided, which separate out at least a portion of fine dust, including fluoride, from recycled alumina. The difference in natural drop velocity and flow properties of fine and coarse particles is used to effect the separation.

9 Claims, 2 Drawing Sheets

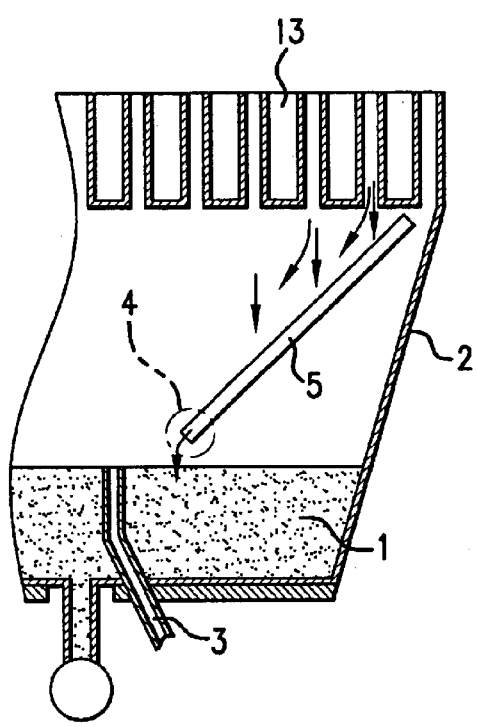
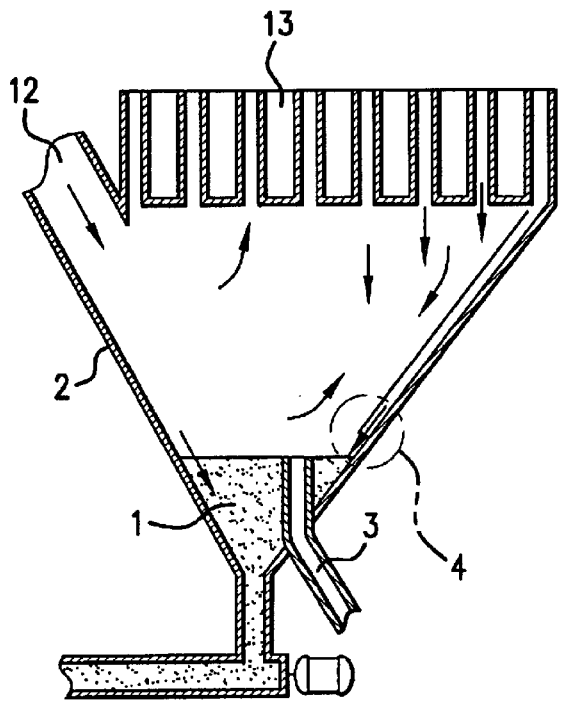
FIG.2  FIG.3
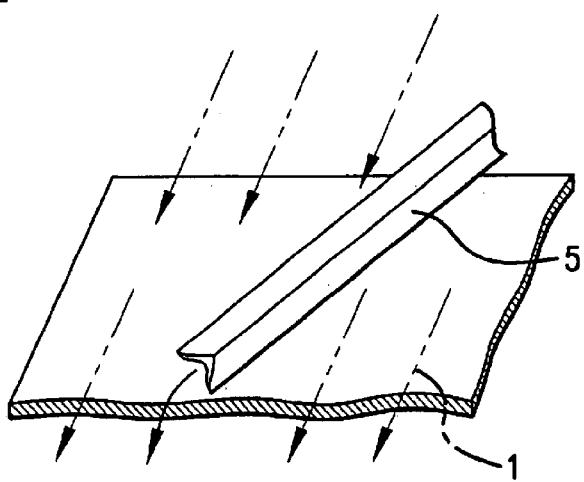
FIG.4

METHOD AND DEVICE FOR A DRY CLEANSING PLANT FOR ALUMINUM REDUCTION FURNACES EXHAUST GAS

FIELD OF THE INVENTION

The present invention relates to a method and a device to increase the capacity, reduce the pressure drop and improve the degree of separation in dry cleansing plants for exhaust gas from aluminum reduction furnaces.

BACKGROUND OF THE INVENTION

The exhaust gas from aluminum reduction furnaces contains among other things strongly polluting fluorine compounds, substantially as a gas (HF) but also in a form of fluorine containing dust. The dust consists of very small particles of fluoride which evaporate from the smelting bath in the furnace and sublimate in the exhaust gas.

The exhaust gas must be cleansed for fluoride and there are today very strict requirements to the cleansing effect. The so called dry cleansing method is at present pretty universal in this area. This is known technology, and there are several different types. The cleansing technology in these plants are based on the condition that the raw materials for aluminum production, aluminum oxide or alumina, which are powder materials, have the property of dry absorption of HF. The exhaust gas is therefore brought in contact with alumina which can absorb the HF contents. The dust forms fluorides, which must be removed by filtering.

Practically all dry cleansing plants of this type are arranged in such a way that the exhaust gas first comes into a reactor where it is brought into more or less intensive contact with alumina for the adsorption of HF, whereupon the gas passes to a bag filter (textile filter) for separation of particulate material. Most of the fine fluorine containing dust and at least a part of the alumina from the reactor will accompany the exhaust gas into the filter.

The removal of fluorides, both as gas and dust, from the aluminum furnaces, is a loss in the production process. But used alumina from the dry cleansing process, which has absorbed HF from the exhaust gas, and the fluorine containing dust that has been separated out in the bag filter, are led as raw material back to the furnaces. This is how a substantial part of the fluorine loss from the furnaces is recovered. Both the high efficiency and economy in fluorine recovery have made the dry cleansing system universal.

In practice, a greater part of the alumina is used in production. First it is used as an absorbent for HF in the dry cleansing plant, and then it is led back to the furnaces, where particulate fluoride is separated in the bag filter. The fresh alumina shall be referred to as primary alumina, while the fluorine containing alumina from the cleansing plant will be referred to as secondary alumina.

The quantities of exhaust gas from the furnaces in the aluminum industry are very large. The dry cleansing plants are therefore usually divided into sections, where each sections comprises a substantially vertical reactor with a discharge into the bag filter. Adsorption of a HF occurs mainly in the reactor in that the even flow of primary alumina is blended in the exhaust gas at the input to the reactor. Alumina is a powder with a grain size substantially in the area of 40 to 150 $\mu$m. Such powder easily is spread like a cloud of dust in the exhaust gas, and provides good contact for the adsorption of HF, but the powder is also coarse enough to be easily separated out of the stream of gas by a dynamic effect, for example by deflection of the gas stream (cyclone effect). In most embodiments the mixture of exhaust gas and alumina is led straight into the bag filter, where a part of the alumina will be separated and fall down in the bottom of the filter as a result of dynamic forces, while a part will follow the gas stream further to the filter bags and be separated there. The fine fluorine containing dust in the exhaust gas has a particle size in the area of 0.1 to 1.0 $\mu$m. It is hardly affected by the dynamic forces, but substantially follows the gas stream to the filter bags.

The bag filters in these plants are for the most part the type with rows of stretch out textile bags, where the dust settles on the outside of the bag cloth. The bags are cleaned one row at the time in operation with internal pulses of pressurized air. A layer of dust on the bags will then fall off and down into the bottom hopper of the filter. There it is mixed with alumina which has passed through the reactor and has been separated by dynamic forces.

The necessary filter area which filters out the dust and alumina from the exhaust gas, determines the size of such dry cleansing plants. The pressure drop over the dust covered filter surface also constitutes the greater part of the pressure drop through the cleansing plant, and is therefore a determining fact for the plants power requirements.

The pressure drop over the dust covered filter surface is for the most part dependent on the consistency of the dust layer. In this connection the coarse grained alumina provides a porous dust layer with a low pressure drop which provides great throughput of gas and great filter capacity.

The fine fluorine containing dust, on the contrary, will close the spaces between the alumina grains, increase the power drop through the dust layer and reduce the capacity. The fine dust also easily penetrates the filter cloth and gives a certain content of fluorine carrying dust in the cleansed gas.

Most critical for the plant's cleansing effect for total fluorine is the adsorption of HF in the reactor. The quantity of alumina in contact with the exhaust gas in the reactor is essential for effective contact and absorption. To increase the quantity of alumina in the reactor and to increase separation of HF it is usual to recycle the separated alumina from the bottom hopper of the filter back into the reactor together with primary alumina. Modem requirements for a cleansing effect far above 99%, makes it necessary to recycle much of the alumina through the reactor, therefore the alumina must be recycled many times before it is tapped out of the plant as secondary alumina and transferred to the furnaces. Separated fine particulate fluoride accompanies the recycling alumina. The more alumina recycled, the more fine dust remains in the system. Continuous fine dust forming on the filter bags increases the dust layer there, which increases the pressure drop, which limits the capacity and causes increased dust penetration. These effects set a limit as to how much recycling of alumina you can have in such plants.

SUMMARY OF THE INVENTION

The present invention relates to a method to limit the effects of recycling alumina in dry cleansing plants. The method consists of separating out at least a part of the fine dust that accompanies the recycling alumina before it is injected back into the reactor, and to lead the separated fine dust out of the system together with secondary alumina, which is tapped out of the cleansing plant in a steady stream to be led back to the furnaces. Even a partial, but continuous separating or removal of fine dust from alumina which is recycled in the reactor-filter-system causes a substantial reduction in the quantity of fine dust in the system and of the negative effects of the filtering process.

To separate fine dust from a mixture of fine and coarse particles, the inventors have made use of differences in natural drop velocity and flow properties for fine and coarse particles in motion. Several apparatus that make use of these principles to separate and lead away fine dust from the recycled alumina that flows in a dry cleansing plant according to the description, have been constructed and tested with good results.

BRIEF DESCRIPTION OF THE DRAWINGS

FIG. 2 shows a partially cut-away, schematic side-elevational view of another embodiment of an apparatus of the present invention.

FIG. 3 shows a front-elevational view of the apparatus of FIG. 2.

FIG. 4 shows a perspective, partially cut-away view of the trough used in the apparatus of FIG. 2.

DETAILED DESCRIPTION

Figure 1:
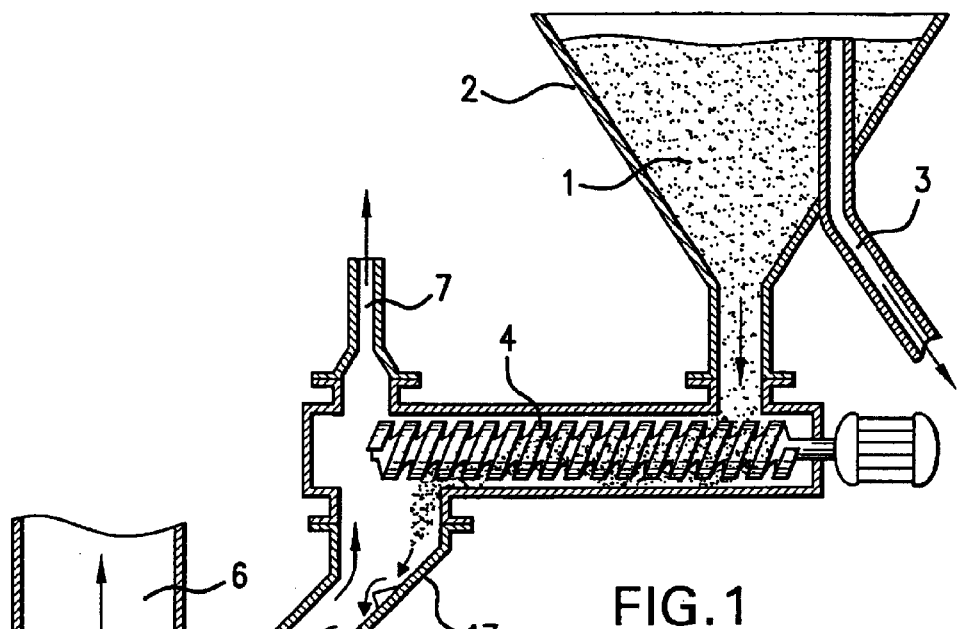
FIG. 1 shows a schematic, side-elevational view of an embodiment of an apparatus of the present invention.

A device which is placed in the recycling system for alumina in a dry cleansing system and that gives dust removal according to the invention is shown in FIG. 1, which is a schematic section of the system. Recycling alumina 1 forms a little basin in the bottom hopper 2 of the filter, and secondary alumina going to the furnaces runs out in the overflow 3.

DETAILED DESCRIPTION

Recycled alumina is measured out and transported with a feeding screw 4 and a gravimetric trough 17 to the reactor 6, where recycled alumina is mixed in the up going flow of uncleaned exhaust gas. An even flow of primary alumina (not shown) is also injected in the reactor. To achieve the desired dust removal of the recycled alumina, according to the invention, a small stream of exhaust gas is sucked up through the gravimetric trough 17 as a counter-stream to the alumina that slides down the sloping bottom of the trough. The rising gas stream will to a certain degree rip up the stream of alumina, and pull out the fine dust particles that have a far lower drop velocity than the velocity of the rising gas. The now dust bearing gas is sucked through the open end of the transport screw 4 through a pipe system 7 to a small additional filter, where the fine dust is filtered out and mixed into the secondary alumina which is going to the furnaces. The velocity of the gas stream up through the trough 17 is adjusted so that the dust removal is as effective as possible without having the gas also tear out alumina particles to any great degree.

The dust removal effect can be improved by having the bottom of the trough 17 equipped with crossing irregularities 8 that rip out the sending stream of alumina particles and give the dust removal gas better access to the whole stream of alumina.

Another device for the dust removal from recycled alumina, and which also makes use of gravimetric flow on an inclined plane, is shown in FIGS. 2, 3 and 4. FIGS. 2 and 3 show the filter bottom hopper 2 in two views, and FIG. 4 shows the device in detail.

Reacted exhaust gas from the reactor with primary and recycled alumina plus dust comes into the inlet 12 and turns up towards the depending filter bags 13 of which FIGS. 2 and 3 only show the bottom part. Some alumina will be separated from the entering gas stream as a result of dynamic forces and continue down in the basin with fluidized alumina 1, which flows like quicksand.

Remaining alumina and fine dust follow the gas stream upward and are filtered on the filter bags. By cleansing of the filter bag the alumina and dust will fall down into the bottom of the hopper. On the side wall of the bottom hopper 2, according to the invention, are mounted one or more slanting troughs 5, shown in perspective in FIG. 4. In the preferred embodiment of the invention it uses an angle which projects from the slanting surface of the bottom of the hopper. A similar effect can be achieved with a slanting trough which forms a part of the side surface of the bottom of the hopper, but this is a more expensive solution.

The purpose of the slanting trough 5 is to utilize the difference in drop velocity and flow properties of the coarser alumina particles and the finer dust particles that fall down from the filter bags when these are cleaned, in order to separate dust from alumina and to lead the dust particles out of the system together with secondary alumina out of outlet 3. The mode of operation is as follows: heavier alumina particles that arrive with the cleansing of the filter bags, fall quickly down towards the gas stream and slide in the most gravimetric direction down to the bottom of the hoppers slanting side surface.

These particles are collected by the slanting trough 5 and form a relatively concentrated stream in the innermost part of the trough. When this stream of alumina reaches the basin of fluidized alumina 1, it continues down to the bottom of the basin as a result of its own velocity and inertia, and is thereby substantially mixed into the stream of recycled alumina, which is tapped from the bottom of the basin.

The lighter particles of fine dust from the filter bags float and are spread by the ascending gas stream, and are distributed to the bottom hoppers slanting side wall, where they float rather than slide down, and then float out of the surface of the basin.

A great part of this separated fine dust on the surface of the basin will then naturally be tapped out of the system through the outlet 3 which drains secondary alumina out of the system by the overflow principle.

This device does not fundamentally separate alumina and dust as effectively as the device in FIG. 1, but this is partly compensated for by the fact that there has been a pre-separation of the alumina-dust-mixture, in that alumina, especially coarser fractions, are separated and end up in the basin as a result of dynamic forces at the gas inlet.

A device according to the invention also has the advantage that it does not require a special suction and filtering system for the separated fine dust.

Figure 5:
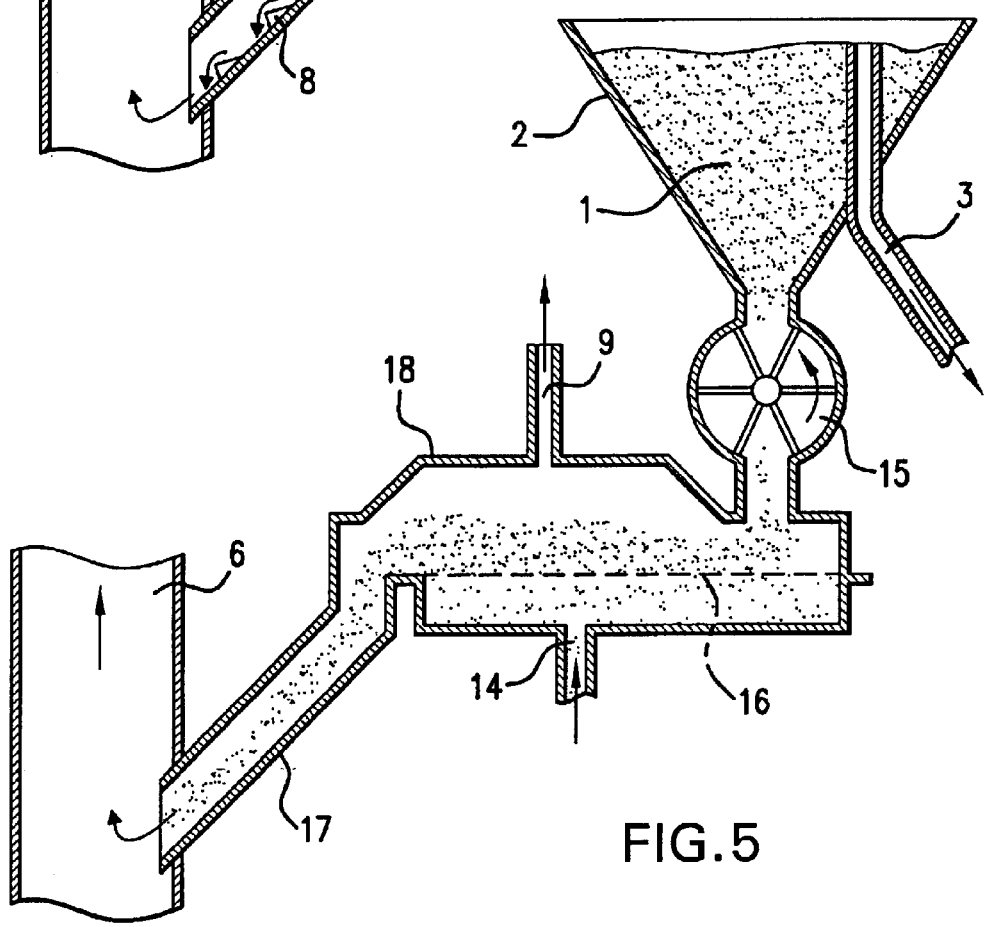
FIG. 5 is a view similar to FIG. 1 showing another embodiment of the present invention.

A device is also provided in the recycling system for alumina, and which also gives a dust removal effect, according to the invention is shown on FIG. 5. Alumina 1 to be recycled is fed down from the bottom of the hopper of the filter with a dozing apparatus which could be a rotating sluice feeder 15 down to a pneumatic separator 16.

This works in principle in the same way as a fluidized trough, in that alumina flows over an air permeable cloth with a flow-through of pressurized air, which is applied from the underside 14. A pneumatic separator, according to the invention, should separate and blow out fine dust reasonably effectively from the alumina-dust-mixture. This mixture must be exposed for a much more powerful flow-through of air than what is used with usual fluidizing and which makes alumina and similar powder material flow as a somewhat viscous fluid. With pneumatic separation the stream of recycled alumina will be violently agitated while fine dust is transferred to the air stream. The top of the separator 18 must be fashioned as a high hood so that substantially only air with fine dust and not a spray of alumina can reach the outlet and be sucked out of the outlet 9 and further through a piping system to a small additional filter where the fine dust is filtered out and mixed in with secondary alumina which is going to the furnaces.

The amount of air which blows through the separator must also be adjusted so that as much as possible the fine dust is separated from the recycled alumina, while not too much of the alumina is brought along. Out feeding of secondary alumina should mainly occur through the overflow pipe 3 which controls the level on the basin in the bottom of the hopper.

Alumina with reduced content of fine fluorine bearing dust flows further down the gravimetric trough 17 and is injected in the ascending stream of the exhaust gas in the reactor 6.

The apparatus described above has been invented, constructed and tested by the inventors, and have proved to be effective for separating fine dust from recycled alumina in dry cleansing plants, which has led to substantial operational improvements for such plants in the form of improved capacity and reduced pressure drop even with increased recycling of alumina, and improved degree of separation both for HF and particular fluorides in the exhaust gas.

What is claimed is:

1. A method for reducing the pressure drop, increasing the capacity and improving the degree of separation in a dry cleansing plant for exhaust gases from aluminum reduction furnaces comprising: at least partially selectively separating fine grain particulate fluoride from filtered recycled alumina before said alumina is recirculated in the dry cleansing plant.

2. The method according to claim 1, further comprising utilizing the difference in natural fall velocity for fine and course particles in air or gas to separate the fine grain particulate fluoride from the filtered recycled alumina.

3. An apparatus for separating fine-grained particulate fluoride out of a stream of filtered recycled alumina, in a dry cleansing plant for exhaust gases from aluminum reduction furnaces, comprising: one or more inclined planes for gravimetric down-flow of said alumina and devices to lead an ascending air or gas stream to blow fine-grained particulate fluoride out of the stream of said alumina.

4. The apparatus according to claim 3, wherein the gravimetric down-flow of said alumina results in separation between fine and coarse particles because of different flow properties, and wherein the apparatus further comprises a slanting trough for selective collection and recycling of course alumina particles.

5. The apparatus according to claim 3, further comprising, a trough or a basin for flow-through of said alumina, wherein the trough or the basin has an air- or gas-permeable bottom, to thereby separate fine and coarse particles by separating particulate fluoride from the flow of said alumina with fluidizing air or gas.

6. A method for reducing fine grain particulate fluoride in a dry cleansing plant, comprising: separating fine grain particulate fluoride from filtered alumina.

7. The method of claim 6, wherein separating includes utilizing the difference in natural fall velocity for fine and course particles in gas to separate the fine grain particulate fluoride from the filtered alumina.

8. The method of claim 6, further comprising flowing the fine grain particulate fluoride and filtered alumina to an aluminum reduction furnace.

9. The method of claim 6, wherein separating includes using a gas stream to agitate the filtered alumina; and exhausting said fine grain particulate fluoride separated from the filtered alumina to an aluminum reduction furnace.

* * * * *